United States Patent [19]

Lesinski

[11] 4,390,919

[45] Jun. 28, 1983

[54] ELECTRONIC SURGE ARRESTOR

[75] Inventor: Leon C. Lesinski, Walpole, Mass.

[73] Assignee: GTE Products Corporation, Stamford, Conn.

[21] Appl. No.: 325,537

[22] Filed: Nov. 27, 1981

[51] Int. Cl.³ .............................................. H02H 9/04
[52] U.S. Cl. ....................................... 361/56; 361/91;
        361/118; 361/111; 307/566; 307/318
[58] Field of Search .................. 361/56, 91, 110, 111,
        361/118, 119, 117; 307/318, 542, 551, 565, 566

[56] References Cited

U.S. PATENT DOCUMENTS

| 3,181,033 | 4/1965 | Bakker | 361/119 |
| 4,068,278 | 1/1978 | Williams | 361/91 X |
| 4,099,217 | 7/1978 | Fitchew | 361/119 X |

OTHER PUBLICATIONS

Electromagnetic Compatability, 1975, May 20–22, IEEE 75CH1012 4 Mont, Clark, "Suppression of Fast Rise-Time Transients".

Primary Examiner—Reinhard J. Eisenzopf
Attorney, Agent, or Firm—Peter Xiarhos; Fred Fisher

[57] ABSTRACT

Fast-response electronic surge arrestors for protecting electrical equipment from the damaging effects of large amplitude, fast rise-time voltage transients. An electronic surge arrestor in accordance with the invention includes first and second transient suppression circuits arranged in parallel and coupled between a flat elongated microwave strip transmission line conductor and ground potential for dissipating transients of first and second polarities appearing on the conductor. Each of the first and second transient suppression circuits includes a fast-response Zener diode and a switching diode arranged in a serial, oppositely-poled fashion and having biased junctions for dissipating transients of the first and second polarity, respectively, while minimizing dissipation of signals in the UHF band which may be received or generated by the electrical equipment and also appear on the microwave strip conductor.

14 Claims, 2 Drawing Figures

ELECTRONIC SURGE ARRESTOR

The invention herein described was made in the course of a contract with the Department of the Air Force.

FIELD OF THE INVENTION

The present invention relates to an electronic surge arrestor and, more particularly, to a fast-response electronic surge arrestor for protecting electrical equipment from large amplitude, fast rise-time voltage transients.

BACKGROUND OF THE INVENTION

There are many applications in which it is desirable or necessary to protect electrical equipment from the harmful effects of large amplitude, fast rise-time voltage transients. These transients may be due, for example, to lightning, power interruptions, static discharge or other similar phenomena, and have amplitudes of up to 2500 volts and rise times of a few nanoseconds. If these transients are not suppressed, it is possible for voltages and currents of excessively large value to be coupled to sensitive electrical equipment and to cause permanent damage thereto, especially if the equipment utilizes integrated circuits, MOS (metal oxide silicon) devices, hybrid devices, and other voltage or current sensitive semiconductor devices and components.

Heretofore, it has been common practice to protect electrical equipment from the damaging effects of voltage transients by using band pass filters or spark gap devices. Band pass filters have the disadvantage of not offering protection against transients in the UHF band (225-400 Mhz), and spark gap devices either do not respond quickly enough, especially in the UHF band, or have a high insertion loss at UHF frequencies. Because of the finite response time of spark gap devices, generally measured in microseconds, it is therefore quite possible and likely that a transient having a very fast rise time, for example, of the order of nanoseconds, will pass by the spark gaps of these devices without being suppressed thereby.

SUMMARY OF THE INVENTION

In accordance with the present invention, a fast-response electronic surge arrestor is provided for protecting electrical equipment from large amplitude, fast rise-time transients and which avoids the disadvantages and shortcomings of prior art arrangements as discussed hereinabove.

The surge arrestor in accordance with the present invention includes an input and an elongated conductor coupled to the input and adapted to be coupled to electrical equipment to be protected from transients. The conductor is in the form of a flat microwave strip transmission line disposed on a ground plane substrate and is operative to receive transients of first and second polarities presented to the input, and also signals in the UHF band for bi-directional transmission between the electrical equipment and the input. Transients of the two polarities are dissipated in accordance with the present invention by first and second transient suppression circuit means arranged in parallel and coupled between the conductor and a source of reference potential. The first transient suppression circuit means is used to dissipate transients of the first polarity and includes a first fast-response Zener diode, a first switching diode, and a source of positive dc reverse bias voltage. The first fast-response Zener diode has an internal capacitance of a predetermined value and has an anode thereof coupled to the source of reference potential. The first switching diode is coupled to the aforementioned conductor and in series with the first Zener diode. The first switching diode has an internal capacitance of a value less than the value of the internal capacitance of the first Zener diode for reducing the effective capacitance between the conductor and the source of reference potential, and further has an anode coupled to the conductor and a cathode coupled to a cathode of the first Zener diode. The first Zener diode as described hereinabove operates in response to a large amplitude, fast rise-time transient of the first polarity present on the conductor to dissipate the transient, and the first switching diodes cooperates with the first Zener diode to minimize dissipation of signals in the UHF band on the conductor. The aforementioned source of positive dc reverse bias voltage is coupled to the juncture of the first Zener diode and the first switching diode and operates to establish a positive dc reverse bias voltage at said juncture for further minimizing dissipation of signals in the UHF band on the conductor due to rectification action of the diodes.

In the same manner as described hereinabove, the second transient suppression circuit means is used to dissipate transients of the second polarity and includes a second fast-response Zener diode, a second switching diode, and a source of negative dc reverse bias voltage. The second Zener diode has an internal capacitance of a predetermined value and has a cathode coupled to the source of reference potential. The second switching diode is coupled to the conductor and in series with the second Zener diode. The second switching diode has an internal capacitance of a value less than the value of the internal capacitance of the second Zener diode for reducing the effective capacitance between the conductor and the source of reference potential, and further has a cathode coupled to the conductor and an anode coupled to an anode of the second Zener diode. The second Zener diode operates in response to a large amplitude, fast rise-time transient of the second polarity present on the conductor to dissipate the transient, and the second switching diode cooperates with the second Zener diode to minimize dissipation of signals in the UHF band on the conductor. The source of negative dc reverse bias voltage is coupled to the juncture of the second Zener diode and the second switching diode and operates to establish a negative dc reverse bias voltage at the juncture having a value for further minimizing dissipation of signals in the UHF band on the conductor due to rectification action of the diodes.

DETAILED DESCRIPTION OF THE INVENTION

Figure 1:
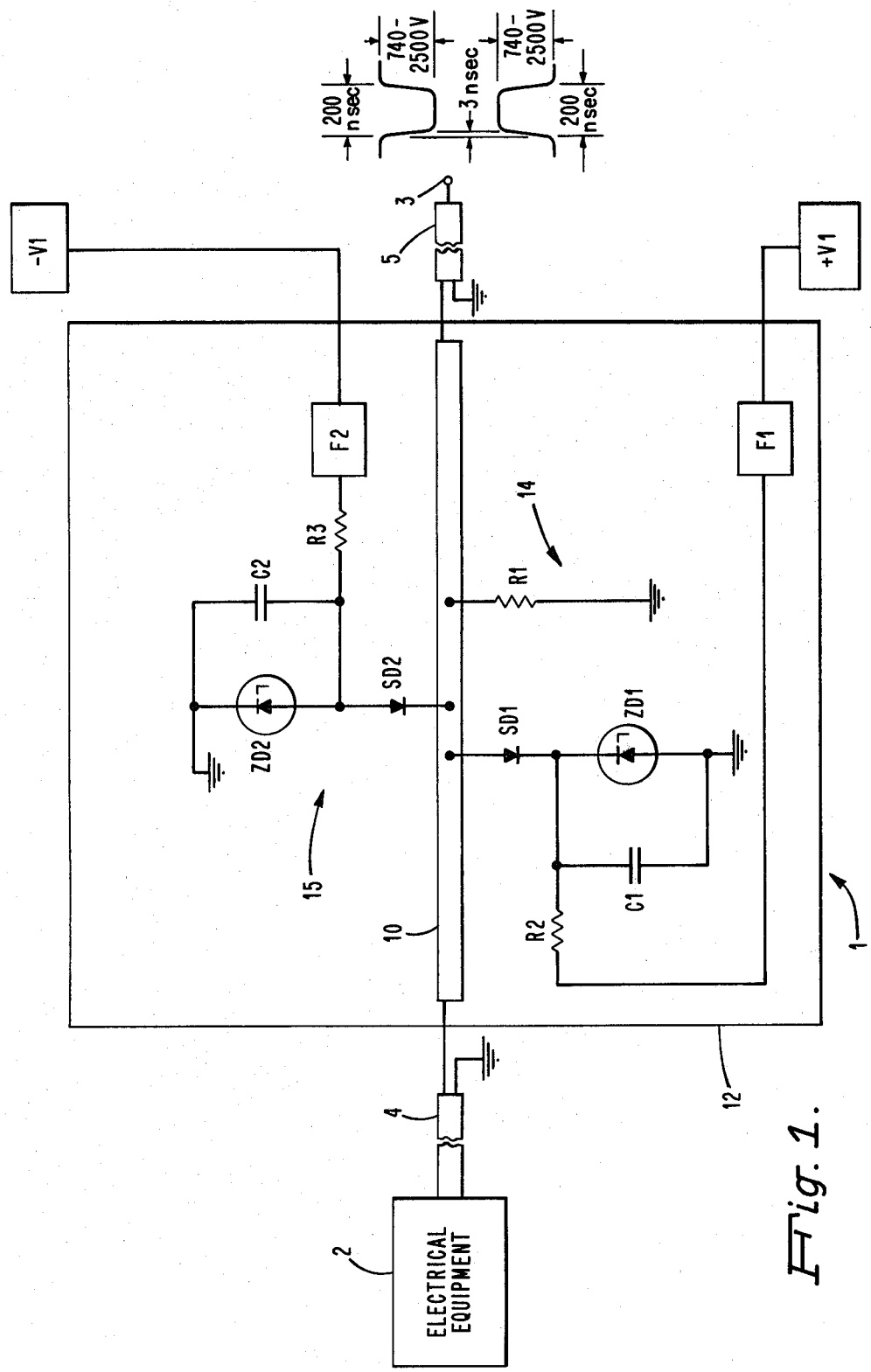
FIG. 1 is a schematic diagram of a fast-response electronic surge arrestor in accordance with a first embodiment of the invention.

Referring now to FIG. 1, there is shown a fast-response electronic surge arrestor 1 in accordance with a first embodiment of the invention for protecting electrical equipment 2 from the potentially harmful effects of large amplitude, fast rise-time voltage transients. The voltage transients may appear at an input 3 of the arrestor 1 and have a typical peak amplitude, either positive or negative, of 740–2500 volts, a rise time of about 3 nanoseconds, and a total duration of about 200 nanoseconds. The electrical equipment 2, which is coupled to the arrestor 1 by way of a coaxial cable 4, may take any suitable form, such as an rf receiver/transmitter, and include internal voltage or current-sensitive circuit components susceptible to damage by large valued voltages and currents resulting from unsuppressed voltage transients. These sensitive components may include, by way of example, integrated circuits, MOS devices, hybrid devices, discrete semiconductor devices, etc.

The electronic surge arrestor 1 as shown in FIG. 1 includes an elongated central conductor 10. This conductor 10 is connected between the aforementioned coaxial cable 4 and another coaxial cable 5 which, in turn, is connected to the aforementioned input 3. In the absence of voltage transients at the input 3 to the coaxial cable 5, signals for use by the electrical equipment 2, for example, rf signals in the UHF band and originating with an antenna, may pass to the electrical equipment 2 by way of the coaxial cable 5, the central conductor 10, and the coaxial cable 4. Similarly, signals from the equipment 2 (e.g., in the UHF band) may be transmitted along the coaxial cable 4, the conductor 10, and the coaxial cable 5 in the opposite direction for utilization by the apparatus coupled to the cable 5 (e.g., the antenna).

The central conductor 10 of the arrestor 1 as described hereinabove is implemented in accordance with the present invention by a flat microwave strip transmission line device disposed on a printed circuit board or substrate 12 having a ground plane to effectively provide a microwave transmission line arrangement having a characteristic impedance of 50 ohms. To achieve this impedance value, the conductor 10 may be formed of a copper laminate and have a width of 3/16 inch and a thickness of 0.06 inch. The printed circuit board 12 may be a standard printed circuit board and have a thickness of 0.06 inch.

Suppression of transients by the electronic surge arrestor 1 is accomplished in accordance with the invention by the use of a pair of transient suppression circuits 14 and 15 connected to the central conductor 10 and arranged in parallel with each other. The transient suppression circuit 14 is arranged to suppress positive-going voltage transients appearing at the input 3 to the coaxial cable 5 and applied to the conductor 10, and, similarly, the transient suppression circuit 15 is arranged to suppress negative-going voltage transients appearing at the input 3 to the coaxial cable 5 and applied to the conductor 10. In both cases, the transients are prevented from being translated into large valued voltages and currents which might be applied to the electrical equipment 2 and damage sensitive internal components of the electrical equipment.

The transient suppression circuit 14 generally includes a Zener diode ZD1, a switching diode SD1, a capacitance C1, a pair of resistances R1 and R2, a filter F1, and a source of positive voltage +V1. As indicated in FIG. 1, the Zener diode ZD1 and the switching diode SD1 are arranged in serial, oppositely-poled fashion with the cathodes of the diodes ZD1 and SD1 being connected to each other, and the anodes of the diodes ZD1 and SD1 being connected, respectively, to ground potential and to the central conductor 10. The capacitance C1 is coupled across the anode and cathode of the Zener diode ZD1. The resistance R1 is connected between the conductor 10 and ground potential for providing a current path to ground potential. The resistance R2, the filter F1 and the positive voltage source +V1 are connected in a series path to the juncture of the diodes ZD1 and SD1.

In a similar fashion as discussed hereinabove, the transient suppression circuit 15 generally includes a Zener diode ZD2, a switching diode SD2, a capacitance C2, a resistance R3, a filter F2, and a source of negative voltage −V1. The Zener diode ZD2 and the switching diode SD2 are arranged in serial, oppositely-poled fashion with the anodes of the diodes ZD2 and SD2 being connected to each other, and the cathodes of the diodes ZD2 and SD2 being connected, respectively, to ground potential and to the central conductor 10. The capacitance C2 is coupled across the anode and cathode of the diode ZD2. The resistance R3, the filter F2 and the source of negative voltage −V1 are connected in a series path to the juncture of the diodes ZD2 and SD2.

The Zener diodes ZD1 and ZD2 as employed in the transient suppression circuits 14 and 15 are selected for their capability to absorb worst-case currents due to fast rise-time, high surge transients on the conductor 10, their theoretically instantaneous response times ($1 \times 10^{-12}$ sec), and their low impedances. The high theoretical response times of the diodes ZD1 and ZD2 make these devices especially suitable for protecting integrated circuits, MOS devices, hybrid devices and other voltage or current-sensitive devices and components, as may be employed in the electrical equipment 2. The Zener avalanche breakdown voltage for each of the diodes ZD1 and ZD2 is selected to have a value based on the peak value of voltage expected to be present on the central conductor 10 during normal operation, that is, in the absence of transients on the conductor 10. By way of example, for a peak voltage on the conductor 10 of about ±130 volts, a suitable value of Zener avalanche breakdown voltage for each of the diodes ZD1 and ZD2 is ±150 volts for the diode ZD1 and −150 volts for the diode ZD2. Suitable peak pulse power ratings for the diodes ZD1 and ZD2 are 1500 watts for one millisecond and 100K watts for 100 nanoseconds. Zener diodes having the above characteristics may be implemented by silicon transient suppression Zener diodes as are generally available under the trade name "TranzZorb" and manufactured and sold by numerous companies including General Semiconductor, Inc. and Semicon, Inc.

The Zener diodes ZD1 and ZD2 as discussed hereinabove have high internal capacitances, for example, 600 pf. Thus, if these devices are used alone and connected directly to the central conductor 10 (rather than by way of the diodes SD1 and SD2), high insertion losses will result, especially in the UHF band, and rf signals on the conductor 10, for example, rf signals generated by the equipment 2, will be dissipated by the diodes ZD1 and ZD2. To prevent such a result, the switching diodes SD1 and SD2 are connected in series with the Zener diodes ZD1 and ZD2 as previously described. The switching diodes SD1 and SD2 are oriented with respect to the Zener diodes ZD1 and ZD2 so as to conduct in the forward direction while the Zener diodes operate in their avalanche breakdown mode, and have low internal capacitances compared with the diodes ZD1 and ZD2, for example, 0.3 picofarads. When the diodes SD1 and SD2 are placed in series with the Zener diodes, the effective capacitance between the conductor 10 and ground potential is significantly reduced, thereby reducing insertion losses and rf signal losses, especially in the UHF band. Suitable implementations of the diodes SD1 and SD2 are PIN diodes of a type IN5719.

The aforementioned capacitances C1 and C2 connected in parallel with the respective Zener diodes ZD1 and ZD2 operate to suppress any rf noise ("white" noise) generated by the Zener diodes ZD1 and ZD2 so that such noise does not leak back onto the conductor 10, and also to aid in the fast rise breakdown characteristics of the Zener diodes. The capacitances C1 and C2 may be implemented by microwave porcelain chip capacitors each having a value of 200 picofarads.

During the transmission of rf signals over the central conductor 10, for example, by the equipment 2, and although the Zener diodes ZD1 and ZD2 and the switching diodes SD1 and SD2 collectively serve to minimize the dissipation of rf signals on the conductor 10 as previously discussed, it is nevertheless possible for small amounts of rf signal energy to be lost in the various diodes due to rectification action. To prevent this loss, a positive dc reverse bias voltage is applied to the juncture of the diodes ZD1 and SD1, and a negative dc reverse bias voltage is applied to the juncture of the diodes ZD2 and SD2. The positive dc reverse bias voltage applied to the juncture of the diodes ZD1 and SD1 is derived from the source of positive voltage $+V1$, which has a typical value of $+250$ volts, in conjunction with the resistance R1 and the filter F1; the negative dc reverse bias voltage applied to the juncture of the diodes ZD2 and SD2 is derived from the source of negative voltage $-V1$, which has a typical value of $-250$ volts, in conjunction with the resistance R2 and the filter F2. The voltages applied to the junctures of the diode pairs ZD1, SD1 and ZD2, SD2 serve to establish trickle currents through the Zener diodes ZD1 and ZD2 and set the voltages of the Zener diodes ZD1 and ZD2 at their avalanche breakdown values, for example, $\pm 150$ volts (which is above the peak value of rf voltage, about $\pm 130$ volts, expected to be present on the conductor 10 during normal operation).

The above-mentioned filters F1 and F2 serve to prevent any rf energy from leaking back into the voltage sources $+V1$ and $-V1$, respectively. Suitable values for the aforementioned resistances R1, R2 and R3 are 120 Kilohms.

In the electronic surge arrestor 1 as described hereinabove, it is desirable to maintain the inherent inductance of the arrestor 1 at as low a value as possible, especially since fast rise-time transient pulses contain ultra-high frequency components. The inherent inductance of the surge arrestor 1 is kept to an acceptably low value by keeping the leads of the various diodes as short as possible.

Figure 2:
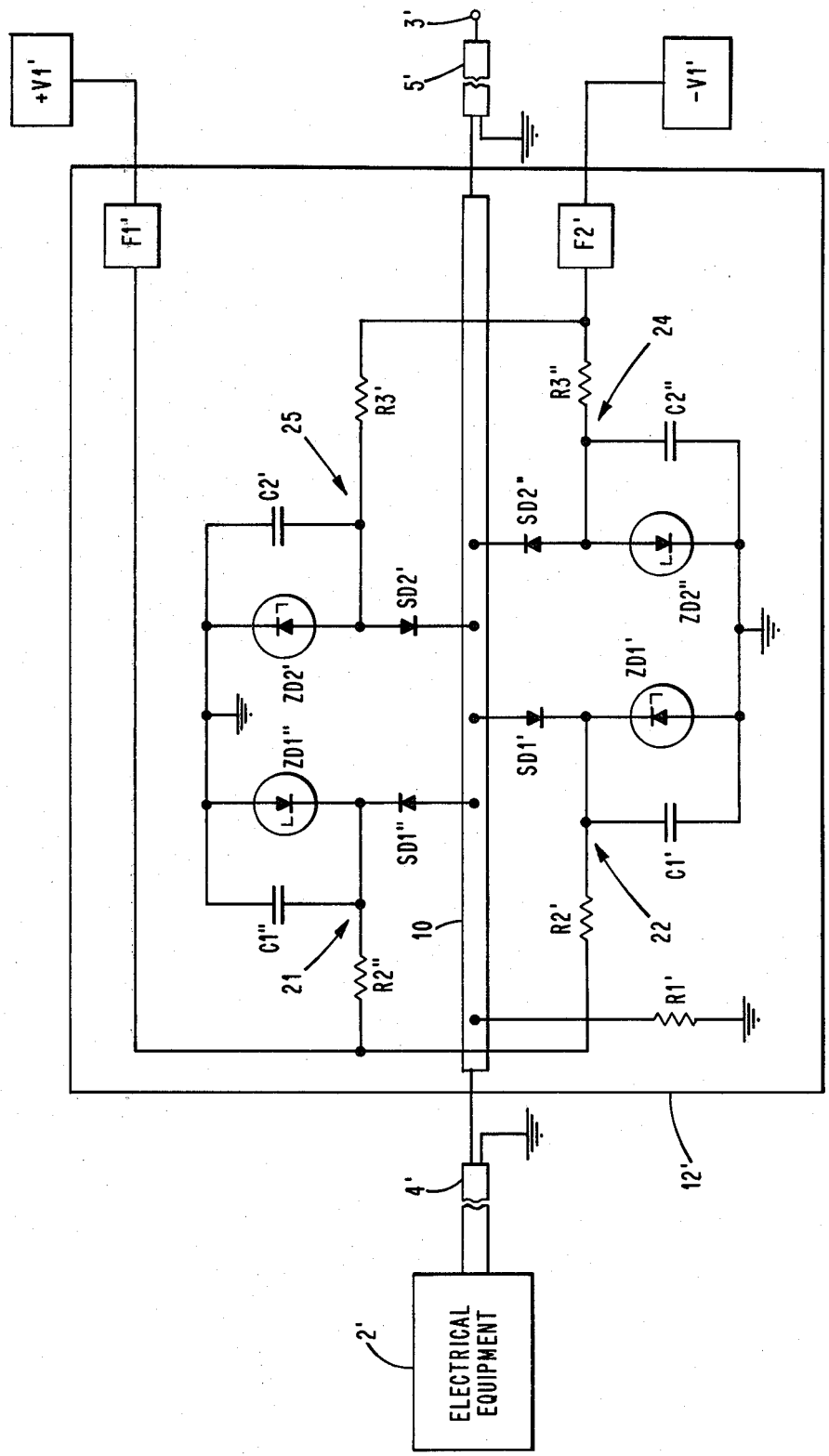
FIG. 2 is a schematic diagram of a fast-response electronic surge arrestor in accordance with a second embodiment of the invention.

Referring now to FIG. 2, there is shown an electronic surge arrestor 20 in accordance with a second embodiment of the invention. The electronic surge arrestor 20 as shown in FIG. 2 is the same as the surge arrestor 1 shown in FIG. 1 with the principal exception being that the surge arrestor 20 employs two transient suppression circuits for each of the two possible polarities of voltage transients, for a total of four transient suppression circuits, instead of a total of two transient suppression circuits. In FIG. 2, the pair of transient suppression circuits used to absorb or dissipate positive-going voltage transients are shown at 21 and 22, and the pair of transient suppression circuits used to absorb or dissipate negative-going voltage transients are shown at 24 and 25. The use of two pairs of transient suppression circuits for dissipating voltage transients instead of a single pair serves to increase the dissipation capability of the surge arrestor 20, specifically, by dividing the current resulting from either a positive or negative voltage transient into two paths instead of a single path as in the case of the arrestor 1 shown in FIG. 1.

The transient dissipating circuits 21 and 22 of the surge arrestor 20 are of the same form as the transient dissipating circuit 14 of FIG. 1 and similarly, the transient dissipating circuits 24 and 25 of the surge arrestor 20 are of the same form as the transient dissipating circuit 15 of FIG. 1. For this reason, those components of the surge arrestor 20 (and associated components) which are the same as in the surge arrestor 1 of FIG. 1 are shown in FIG. 2 with primed reference numerals and designations, and those components added to the surge arrestor 20 and not shown in FIG. 1 are shown in FIG. 2 with double primed reference numerals and designations. Further, since the surge arrestor 20 operates in the same manner as the surge arrestor 1, but for the increased current capability of the surge arrestor 20, no further discussion of the surge arrestor 20 is believed to be necessary and, thus, will not be presented herein.

While there has been disclosed what are considered to be preferred embodiments of the invention, it will be apparent to those skilled in the art that various changes and modifications may be made therein without departing from the invention as called for in the appended claims.

What is claimed is:

1. A fast-response electronic surge arrestor for protecting electrical equipment from large amplitude, fast rise-time transients of first and second polarities, said surge arrestor comprising:

an input;

an elongated conductor coupled to the input and adapted to be coupled to electrical equipment to be protected from transients, said conductor being in the form of a flat microwave strip transmission line disposed on a ground plane substrate and operative to receive transients of first and second polarities presented to the input and also signals in the UHF band for bi-directional transmission between the electrical equipment and the input;

a source of reference potential;

first and second transient suppression circuit means arranged in parallel and coupled between the conductor and the source of reference potential for dissipating transients of the first and second polarities, respectively;

said first transient suppression circuit means comprising:

a first fast-response Zener diode having an internal capacitance of a predetermined value and further having an anode coupled to the source of reference potential and a cathode;

a first switching diode coupled to the conductor and in series with the first Zener diode and having an internal capacitance of a value less than the value of the internal capacitance of the first Zener diode for reducing the effective capacitance between the conductor and the source of reference potential, said first switching diode having an anode coupled to the conductor and a cathode coupled to the cathode of the first Zener diode;

said first Zener diode being operative in response to a large amplitude, fast rise-time transient of the first polarity present on the conductor to dissipate said transient and said first switching diode cooperating with the first diode to minimize dissipation of signals in the UHF band on the conductor; and a source of positive dc reverse bias voltage coupled to the juncture of the first Zener diode and the first switching diode and operative to establish a positive dc reverse bias voltage at said juncture having a value for further minimizing dissipation of signals in the UHF band on the conductor due to rectification action of the diodes; and said second transient suppression circuit means comprising:

a second fast-response Zener diode having an internal capacitance of a predetermined value and further having a cathode coupled to the source of reference potential and an anode;

a second switching diode coupled to the conductor and in series with the second Zener diode and having an internal capacitance of a value less than the value of the internal capacitance of the second Zener diode for reducing the effective capacitance between the conductor and the source of reference potential, said second switching diode having a cathode coupled to the conductor and an anode coupled to the anode of the second Zener diode;

said second Zener diode being operative in response to a large amplitude, fast rise-time transient of the second polarity present on the conductor to dissipate said transient and said second switching diode cooperating with the second Zener diode to minimize dissipation of signals in the UHF band on the conductor; and a source of negative dc reverse bias voltage coupled to the juncture of the second Zener diode and the second switching diode and operative to establish a negative dc reverse bias voltage at said juncture having a value for further minimizing dissipation of signals in the UHF band on the conductor due to rectification action of the diodes.

2. An electronic surge arrestor in accordance with claim 1 wherein:
each of the first and second switching diodes is a PIN diode.

3. An electronic surge arrestor in accordance with claim 1 wherein:
each of the positive and negative transients has an amplitude in excess of 700 volts, and a rise time and duration each measured in nanoseconds; and
each of the first and second Zener diodes has a response time less than the rise time and duration of the transients.

4. An electronic surge arrestor in accordance with claim 1 further comprising:
first and second capacitances coupled between the anodes and cathodes of the first and second Zener diodes, respectively, for suppressing any rf noise generated by the Zener diodes, thereby to prevent said noise from leaking back onto the conductor.

5. An electronic surge arrestor in accordance with claim 1 wherein:
the source of positive dc reverse bias voltage is operative to establish the juncture of the first Zener diode and the first switching diode at a positive dc reverse bias voltage having a value in excess of the positive peak value of rf signals on the conductor; and the source of negative dc reverse bias voltage is operative to establish the juncture of the second Zener diode and the second switching diode at a negative dc reverse bias voltage having a value in excess of the negative peak value of rf signals on the conductor.

6. An electronic surge arrestor in accordance with claim 1 wherein:
each of the positive and negative transients has an amplitude in excess of 700 volts, and a rise time and duration each measured in nanoseconds;
each of the first and second Zener diodes has a response time less than the rise time and duration of the transients;
each of the first and second switching diodes is a PIN diode;
the source of positive dc reverse bias voltage is operative to establish the juncture of the first Zener diode and the first switching diode at a positive dc reverse bias voltage having a value in excess of the positive peak value of rf signals on the conductor; and
the source of negative dc reverse bias voltage is operative to establish the juncture of the second Zener diode and the second switching diode at a negative dc reverse bias voltage having a value in excess of the negative peak value of rf signals on the conductor.

7. An electronic surge arrestor in accordance with claim 6 further comprising:
first and second microwave porcelain chip capacitances coupled between the anodes and cathodes of the first and second Zener diodes, respectively, for suppressing any rf noise generated by the Zener diodes, thereby to prevent said noise from leaking back onto the conductor.

8. A fast-response electronic surge arrestor for protecting electrical equipment from large amplitude, fast rise-time transients of first and second polarities, said surge arrestor comprising:
an input;
an elongated conductor coupled to the input and adapted to be coupled to electrical equipment to be protected from transients, said conductor being in the form of a flat microwave strip transmission line disposed on a grond plane substrate and operative to receive transients of first and second polarities presented to the input and also signals in the UHF band for bi-directional transmission between the electrical equipment and the input;
a source of reference potential;
first and second pairs of transient suppression circuit means arranged in parallel and coupled between the conductor and the source of reference potential for dissipating transients of the first and second polarities, respectively;
each of said first pair of transient suppression circuit means comprising:
a fast-response Zener diode having an internal capacitance of a predetermined value and further having an anode coupled to the source of reference potential and a cathode;
a switching diode coupled to the conductor and in series with the Zener diode and having an internal capacitance of a value less than the value of the internal capacitance of the Zener diode for reducing the effective capacitance between the conductor and the source of reference potential, said switching diode having an anode coupled to the conductor and a cathode coupled to the cathode of the Zener diode;

the Zener diodes of the first pair of transient suppression circuit means being operative in response to a large amplitude, fast rise-time transient of the first polarity present on the conductor to collectively dissipate said transient, and the switching diodes of the first pair of transient suppression circuit means cooperating with the Zener diodes to minimize dissipation of signals in the UHF band on the conductor; and a source of positive dc reverse bias voltage coupled to the juncture of the Zener diodes and the switching diodes of the first pair of transient suppression circuit means and operative to establish a positive dc reverse bias voltage at said junctures each having a value for further minimizing dissipation of signals in the UHF band on the conductor due to rectification action of the diodes; and each of said second pair of transient suppression circuit means comprising:

a fast-response Zener diode having an internal capacitance of a predetermined value and further having a cathode coupled to the source of reference potential and an anode;

a switching diode coupled to the conductor and in series with the Zener diode and having an internal capacitance of a value less than the value of the internal capacitance of the Zener diode for reducing the effective capacitance between the conductor and the source of reference potential, said switching diode having a cathode coupled to the conductor and an anode coupled to the anode of the Zener diode;

the Zener diodes of the second pair of transient suppression circuit means being operative in response to a large amplitude, fast rise-time transient of the second polarity present on the conductor to collectively dissipate said transient, and said switching diodes of the second pair of transient suppression circuit means cooperating with the Zener diodes to minimize dissipation of signals in the UHF band on the conductor; and a source of negative dc reverse bias voltage coupled to the junctures of the Zener diodes and switching diodes of the second pair of transient suppression circuit means and operative to establish negative dc reverse bias voltages at said junctures each having a value for further minimizing dissipation of signals in the UHF band on the conductor due to rectification action of the diodes.

9. An electronic surge arrestor in accordance with claim 8 wherein:
each of the switching diodes of the first and second pairs of transient suppression circuit means is a PIN diode.

10. An electronic surge arrestor in accordance with claim 8 wherein:
each of the positive and negative transients has an amplitude in excess of 700 volts, and a rise time and duration each measured in nanoseconds; and each of the Zener diodes of the first and second pairs of transient suppression circuit means has a response time less than the rise time and duration of the transients.

11. An electronic surge arrestor in accordance with claim 8 further comprising:
a capacitance coupled between the anode and cathode of each Zener diode of the first and second pairs transient suppression circuit means for suppressing any rf noise generated by the Zener diode, thereby to prevent said noise from leaking back onto the conductor.

12. An electronic surge arrestor in accordance with claim 8 wherein:
the source of positive dc reverse bias voltage is operative to establish the junctures of the Zener diodes and the switching diodes of the first pair of transient suppression circuit means at positive dc reverse bias voltages each having a value in excess of the positive peak value of rf signals on the conductor; and the source of negative dc reverse bias voltage is operative to establish the junctures of the Zener diodes and the switching diodes of the second pair of transient suppression circuit means at negative dc reverse bias voltages each having a value in excess of the negative peak value of rf signals on the conductor.

13. An electronic surge arrestor in accordance with claim 8 wherein:
each of the positive and negative transients has an amplitude in excess of 700 volts, and a rise time and duration each measured in nanoseconds;
each of the Zener diodes of the first and second pair of transient suppression circuit means has a response time less than the rise time and duration of the transients;
each of the switching diodes of the first and second pairs of transient suppression circuits means is a PIN diode;
the source of positive dc reverse bias voltage is operative to establish the junctures of the Zener diodes and the switching diodes of the first pair of transient suppression circuit means at positive dc reverse bias voltages each having a value in excess of the positive peak value of rf signals on the conductor; and
the source of negative dc reverse bias voltage is operative to establish the junctures of the Zener diodes and the switching diodes of the second pair of transient suppression circuit means at negative dc reverse bias voltages each having a value in excess of the negative peak value of rf signals on the conductor.

14. An electronic surge arrestor in accordance with claim 13 further comprising:
a microwave porcelain chip capacitance coupled between the anode and cathode of each of the Zener diodes of the first and second pairs of transient suppression circuit means for suppressing any rf noise generated by the Zener diode, thereby to prevent said noise from leaking back onto the conductor.

* * * * *